W. A. RICHARDSON.
CLAMP.
APPLICATION FILED DEC. 2, 1916.
1,243,104.
Patented Oct. 16, 1917.
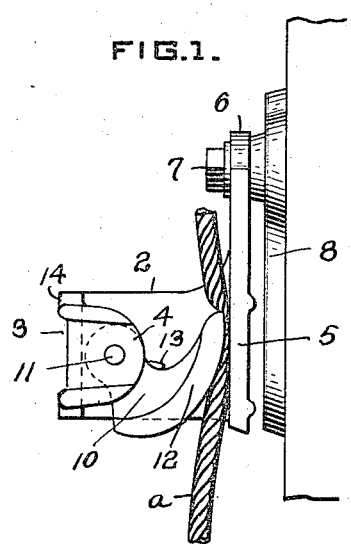
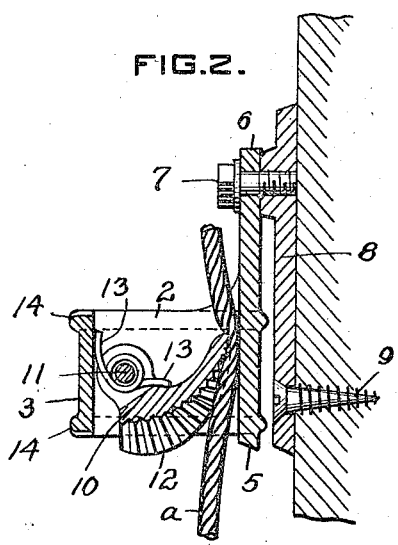
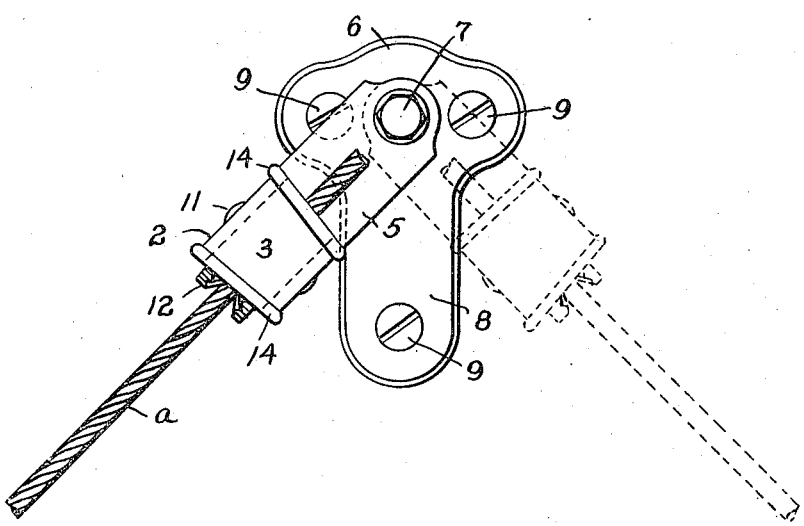
WITNESSES
INVENTOR
William A. Richardson

UNITED STATES PATENT OFFICE.

WILLIAM A. RICHARDSON, OF EDWARDSVILLE, ILLINOIS, ASSIGNOR TO RICHWIN MANUFACTURING COMPANY, OF CHICAGO, ILLINOIS, A CORPORATION OF ILLINOIS.

CLAMP.

1,243,104.     Specification of Letters Patent.     Patented Oct. 16, 1917.

Application filed December 2, 1916. Serial No. 134,668.

*To all whom it may concern:*

Be it known that I, WILLIAM A. RICHARDSON, a citizen of the United States, residing at Edwardsville, in the county of Madison and State of Illinois, have invented certain new and useful Improvement in Clamps, of which the following is a specification.

My invention consists of an improvement in clamping devices for holding ropes, cords, straps, etc., fixedly in position on a swinging bracket, whereby to provide for the constant retention of a flexible supporting element at various swinging positions.

The device comprises a pivoting base adapted to be secured upon a wall or other surface and a supporting frame or housing, pivotally mounted on said base and provided with a locking dog, constructed and adapted to operate in the manner more fully hereinafter described.

Referring to the drawings showing the device:—

Figure 1 is a view in side elevation showing a flexible holding element, as a rope, in gripped position.

Fig. 2 is a similar view in central vertical section.

Fig. 3 is a face view of the device showing it swung to one side.

Referring to the drawings, the pivoted or swinging supporting frame for the dog, which may conveniently be made of a single casting, is so shaped as to provide a main supporting side 2, a cross portion 3 and a shorter side portion 4, parallel to the side 2, and a base or bearing portion 5. The frame as thus constructed, is open at one side as shown for the insertion of the flexible element, as a rope *a*. The base 5 is extended upwardly and provided with a pivoting extension 6, adapted to be secured by a bolt or stud 7 upon a supporting base 8. Said base is secured against a wall or other suitable surface by screws 9, and provides a rigid mounting for the base 5 which, in such case, constitutes a swinging bracket.

The active locking element of the invention is a locking jaw or dog 10, pivoted by a pin or rivet 11, between the back 2 and the front 4 of the swinging housing, so as to provide for free swinging action of the dog on its pivotal mounting.

The edge portion of the dog 10 is developed around the pivoting center 11 in the form of a compound spiral curve, the radius of which constantly increases, similar to a cam face, and provides a gripping surface which is eccentric to the bearing 11. The gripping edge 12 of the dog 10, as thus made, is preferably recessed centrally of the dog throughout its entire portion, such depression being preferably in the form of a V recess.

In this respect, the device is similar to that of an accompanying application A, filed herewith.

A spring 13 is mounted around the pivotal bolt 11, bearing by one end and against the cross member 3, and by the other against the dog, whereby to normally press it toward the base 5.

The holding frame or housing is preferably reinforced by a suitable strengthening rib 14, and is so constructed as to provide for the easy insertion and removal of the rope *a*, sidewise, upon retracting the dog.

The construction and operation will be clearly understood from the foregoing description.

The invention is well adapted to use in connection with a swinging load of any kind, or wherever it is desired to provide for the constant maintenance of holding tension on the cord at varying positions.

What I claim is:—

1. A swinging clamp consisting of a rigid base, a swinging housing pivoted thereto having a bearing portion and a pivoting portion extending outwardly therefrom, and a gripping dog pivotally mounted in said pivoting portion and adapted to engage a flexible element and clamp it against the bearing portion of the housing.

2. A swinging clamp consisting of a base, a swinging housing pivoted thereto having a bearing portion and a pivoting portion extending outwardly therefrom, and a gripping dog pivotally mounted in said pivoting portion having a peripheral edge portion of increasing radius.

3. In combination, a supporting base and means for securing it in position, a swinging housing having a lower flat bearing and an upper attaching portion pivotally connected with the base, an open-sided mounting portion extending outwardly from the bearing portion of the housing at one side thereof, and a gripping dog pivotally mounted therein and having a rounded edge portion adapted to swing toward the bearing portion of the housing.

4. In combination, a supporting base and means for securing it in position, a swinging housing having a lower flat bearing and an upper attaching portion pivotally connected with the base, an open-sided mounting portion extending outwardly from the bearing portion of the housing at one side thereof, and a gripping dog pivotally mounted therein and having a rounded edge portion adapted to swing toward the bearing portion of the housing and having an actuating spring.

In testimony whereof I hereunto affix my signature.

WILLIAM A. RICHARDSON.

Copies of this patent may be obtained for five cents each, by addressing the "Commissioner of Patents, Washington, D. C."